Sept. 2, 1924. Re. 15,909

X. PFRUNDER

BRAIDING MACHINE

Original Filed July 9, 1923 2 Sheets-Sheet 1

WITNESS

Wm. Wells

INVENTOR,

Xaver Pfrunder,

BY

John Dennerl

ATTORNEY

Sept. 2, 1924. Re. 15,909

X. PFRUNDER

BRAIDING MACHINE

Original Filed July 9, 1923 2 Sheets-Sheet 2

WITNESS

Wm. L. Bell.

INVENTOR,

Xaver Pfrunder,

BY

John Sturwald.

ATTORNEY

Reissued Sept. 2, 1924. Re. 15,909

UNITED STATES PATENT OFFICE.

XAVER PFRUNDER, OF CLIFTON, NEW JERSEY, ASSIGNOR TO WALSER MANUFACTURING COMPANY, A FIRM COMPOSED OF LOUIS KNECHT AND GUSTAV-DONAT, OF CLIFTON, NEW JERSEY.

BRAIDING MACHINE.

Original No. 1,376,539, dated December 4, 1923, Serial No. 650,392, filed July 9, 1923. Application for reissue filed May 12, 1924. Serial No. 712,364.

*To all whom it may concern:*

Be it known that I, XAVER PFRUNDER, a citizen of the Republic of Switzerland, residing at Clifton, New Jersey, have invented new and useful Improvements in Braiding Machines, of which the following is a specification.

This invention relates to improvements in braiding machines without guide plates and of the type in which the drivers are provided with gear wheels for rotating the drivers, and the spool carriers are provided at their lower ends with recesses with which locking means adapted to move in a substantially vertical direction co-operate, the locking means performing the transfer of the spool-carriers from one driver to the adjacent driver.

The present invention has for its object to provide an improved construction of a braiding machine of this type which presents several advantages over known machines, as will be fully set forth hereinafter.

According to the present invention each locking means is a bolt slidable rectilineally in a driver into and out of and normally held in position to engage a coupling portion of the carrier and lock the latter to the driver containing such bolt, each bolt having a cam portion to be engaged by the cam portion of the other bolt and each bolt on alternate revolutions of the intergeared drivers being arranged to engage both said coupling portion of the carrier and the cam portion of the other bolt and move the latter clear of the former, as by wedging itself between said coupling portion and cam portion. The form of the bolt, such as that hereinafter described, is not material.

The means for guiding the pin may consist of a bore in the body of the gear wheel which bore may be arranged more or less at an angle to the axis of the driver. A spring may be detachably connected to the locking means urging the latter in the upward direction; a simple unhooking of the spring renders it thus possible to remove its locking means in the downward direction so that the number of effective locking means on a driver can be conveniently varied for the purpose of varying the pattern of the braided material.

Preferably means are provided for preventing a rotation of the spool-carrier during its transfer from one driver to another which are described hereinafter.

A constructional example of the subject matter of the present invention is illustrated on the accompanying drawings, in which.

Figure 1:
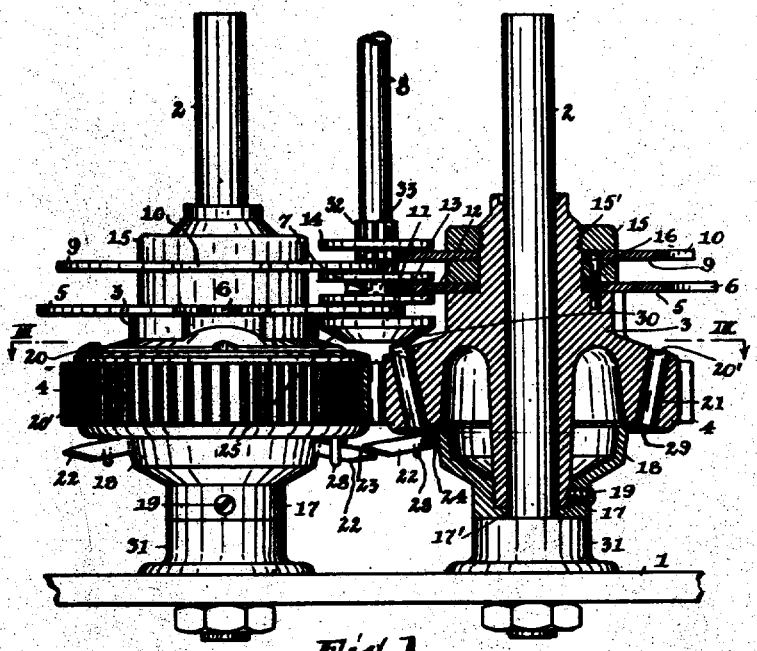
Fig. 1 shows two adjacent drivers, one in elevation and the other in a vertical section, and the lower part of a spool-carrier in its position between the drivers.
Figure 2:
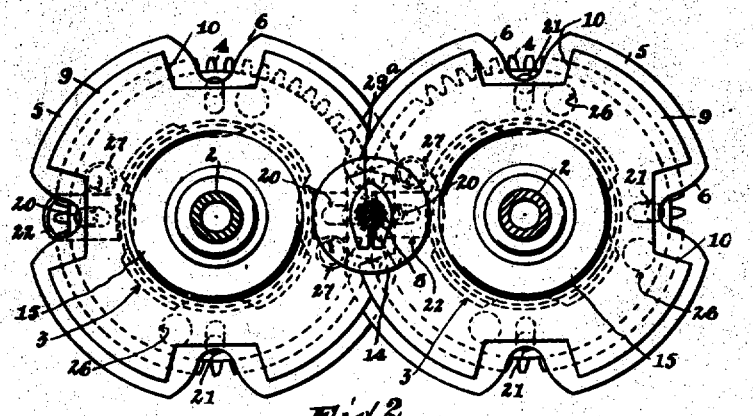
Fig. 2 is a plan view of Fig. 1.
Figure 3:
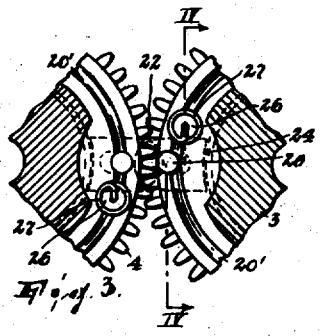
Figure 4:
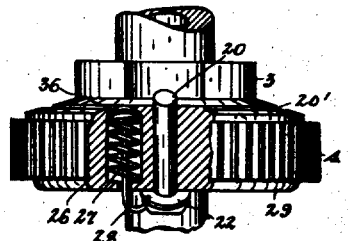
Figure 6:
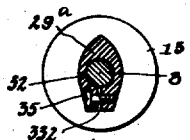
Figure 5:
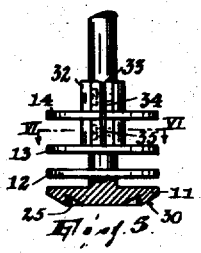
Figure 7:
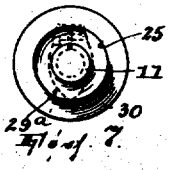
Figure 8:
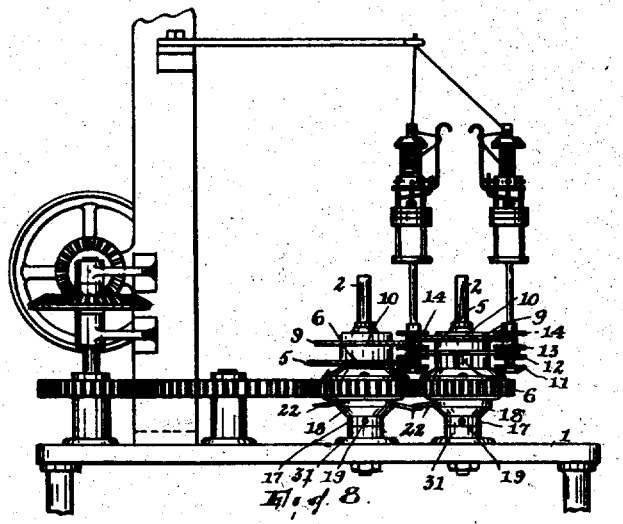

Fig. 3 is a part of a horizontal section along the line III—III of Fig. 1, showing the locking means and the springs, Fig. 4 is an elevation of the driver with parts shown in section along line IV—IV of Fig. 3, Fig. 5 shows the lower part of a spool-carrier partly in elevation and partly in section, Fig. 6 is a horizontal section along line VI—VI of Fig. 5, Fig. 7 is a view of the lower end of the spool-carrier seen from below and Fig. 8 is a general arrangement of a braiding machine provided with the improvements according to the present invention.

Referring now to the drawings, 1 denotes the base plate of the braiding machine on which base plate tubes 2 are rigidly fixed. Upon each tube 2 a driver 3 is rotatable.

Each driver 3 is provided with a gear wheel 4 forming one piece with the driver; the wheels of the adjacent drivers intermesh and cause adjacent drivers to rotate in opposite directions. To one or more of said gear wheels 4 rotation is imparted from a driving shaft in a known manner; the general arrangement of a braiding machine of this type is illustrated in Fig. 8 of the drawings. Above the gear wheel a cylindrical disk 5 is arranged which is provided at its circumference with semi-circular notches 6 for receiving the cylindrical portions 7 of the spool-carrier 8 and causing thereby the latter to take part in the rotating movement of the driver. Four notches 6 are provided in the disk 5 shown in the drawing; however, a greater or smaller number of notches may be provided to suit special requirements. Above the disk 5 a further disk 9 is arranged provided with recesses 10. The disks 5 and 9 of adjacent drivers are arranged at different elevations; the lower disk 5 projects in between disks 11, 12 and 12, 13 respectively provided on the spool-carrier, the vertical distance between the disks 11, 12 and 12, 13 corresponding substantially to the thickness of the respective disks. The disk 9 of the left-hand driver in Fig. 1 bears upon the disk 13 of the spool-carrier and the disk 9 of the right hand driver projects below the disk 14 on the spool-carrier. By means of the disks 5 and 9 of the drivers and the disks 11—14 of the spool-carrier the latter is secured in its vertical position. The disks 5 and 9 of a driver are fixed on a reduced part of the latter by means of screw nut 15 co-operating with screw thread 15′ on the driver; a set pin 16 passing through the disks 5 and 9 and penetrating into the body of the driver prevents a turning of said disks relatively to the driver. Below the gear wheel 4 a sleeve member 17 is provided having a dish-shaped enlargement 18 in its upper part. The lower end of the boss of the driver 3 fits into a cylindrical recess 17′ provided in the sleeve member 17 and is secured to the latter by a set screw 19. The sleeve member 17 is supported by a base part 31 resting on the table 1. By these means the height of the driver 3 relatively to the table 1 can be adjusted by adjusting the extent to which the lower end of the driver projects into the cylindrical recess 17′.

In the present example the bolts for locking the spool-carriers to one or the other of two adjacent drivers comprise the pins 20 which are guided in bores 21 provided in the body of the gear wheel. In the embodiment of the invention illustrated in the drawings the bores 21 are inclined towards the axis of the driver. To the lower end of the pin 20 a plate 22 affording the mentioned cam-portion of the bolt is rigidly connected, the outer end of which is shaped as a knife edge 23 and the inner end 24 adjacent to the driver is recessed to a cylindrical surface which co-operates with the outer circumference of the dish-shaped extension 18 of the sleeve member 17 in order to prevent a turning motion of the locking means around the axis of the pin 20. The upper end of the latter is bevelled and is adapted to enter into a cylindrical recess 25 provided on the lower side of the disk 11 forming the coupling portion of the spool-carrier. The profile of the recess 25 corresponds to the inclination of the bevelled upper end of the pin 20. At the side of each pin 20 a bore 26 is provided in the body of the gear wheel in which bore a compression spring 27 is housed and which is detachably connected with the locking member, one end of the spring forming a hook 28 which enters a hole provided in the plate 22. The spring 27 tends to urge the bolt in the upward direction and in the disengaged position the plate or cam-portion of said bolt rests against the surface 29 of the driver; the left hand locking means on the left-hand driver of Fig. 1 is illustrated in its position when not engaging a spool carrier. 20′ denotes a circular groove for lubricating all the pins 20 of a driver. In order to prevent the knife-edged ends of the plates or coupling portions 22 of adjacent drivers from striking against each other during the rotation of the drivers, the surfaces 29 of adjacent drivers are arranged at different elevations.

In order to remove a bolt it is sufficient to disengage the end 28 of the spring; the bolt may then be drawn out in the downward direction without any dismantling of the driver.

In order to prevent a rotation of a spool-carrier during the transfer of the latter from one driver to the adjacent driver there is provided on the arbor of the spool-carrier a part 29ᵃ having the shape of a flat iron (Fig. 6); the notches 10 in the disk 9 are so shaped that two notches in the disks 9 of the adjacent drivers surround the part 29ᵃ with clearance when they register. The part 29ᵃ is made in one piece with the disk 14 and with a sleeve part 32 and the whole is slotted in the radial direction at 33 so that it can be clamped by means of the set pins 34 and 35 to the arbor 8 of the spool-carrier, over which it is pushed.

The transfer of a spool carrier is carried out in the following manner:

In the disengaged position of the locking means, i. e., when no spool-carrier is inserted in the notch 6 of the disk 5 arranged above the locking means or bolt, the latter is pressed by the action of the spring in the upward direction so that the upper face of the plate 22 bears against the face 29 of the driver. The insertion of a spool-carrier into a driver is effected by pushing the spool-carrier sidewise upon the disks 5 and 9 whereby the bevelled edge 30 of the disk or coupling portion 11 glides over the bevelled end of the pin 20 and causes a displacement of the latter in the downward direction against the action of the spring 27. Toward the end of this sidewise movement when the spool-carrier has fully entered the notch 6 the pin 20, under the action of its spring, enters into the circular groove 25. The bevelled end of the pin 20 abuts against the bottom of the groove 25 and the upward movement of the bolt is limited thereby. In Fig. 1 the bolt of the right hand driver is illustrated in this position and it will be seen from the drawing that with the bolt in this position the plate 22 does not bear against the surface 29 of the driver but is at a lower level.

When a spool-carrier locked to one of the drivers is carried around to the adjacent driver the bolt of the first driver comes into co-operation with the disengaged bolt of the other driver. Thereby the knife edge 23 of the plate 22 of the disengaged bolt is pushed over the knife edge of the plate 22 of the bolt engaging the spool-carrier and causes a displacement of the latter in the downward direction. In Fig. 1 this has just occurred, the pin 20 of the previously engaged bolt being withdrawn from the groove 25, and upon the further rotary movement of the drivers the pin 20 of the previously disengaged bolt enters into the circular groove of the spool-carrier, whereby the latter is locked to the adjacent driver.

The thickness of the disks 5 and 9 can be so chosen that the lower disk 5 of a driver is made thicker than the disk 5 of an adjacent driver which is at a higher elevation, the vertical distance between disks 11 and 12 on the spool-carrier being chosen larger than the vertical distance between the disks 12 and 13 of the spool-carrier to correspond to the difference in the thickness of the disks 5. The disks 9 are made thinner than the thinner one of the disks 5. Thereby the advantage is obtained that the thickest of the disks 5 after it has been worn, may be grounded and thereafter be inserted to replace a thinner disk 5 of an adjacent driver, whilst the worn thinner disk 5 of the latter can be worked to the shape and thickness of the disk 9. The securing of the disks by means of a screw joint to the driver permits a convenient exchange of said disks.

In order to prevent waste material from lodging in the bore 26 in which the spring 27 is arranged a cover 36, as indicated in Fig. 4, may be provided for closing said bore; the upper end of the bore is reduced to hold the cover in place which, being of thin material, may be sprung into the bore at the upper end thereof.

With the braiding machine according to the present invention the possibility of making the driver and its gear wheel of one piece, i. e., to cast them in one piece, implies a considerable simplication and reduction in the costs of manufacturing a braiding machine; furthermore the undesirable disarranging or getting loose of the gear wheel on the driver is thus avoided.

Further advantages over the known braiding machines are the following: A short movement and a good guidance and simplification of the locking means; the guide rod of the locking means forms itself the member which locks the spool-carrier; a secure action of the locking means with the circular groove in the spool-carrier is always ensured; the locking means work therefore always in a reliable manner when the machine runs at high speeds. The locking means are operative for both directions of rotation of the machine. Locking means and springs are protected against waste material and therefore work reliably. The fact that the locking means engages a spool carrier and the end of the pin abuts against the bottom of the groove, makes the provision of a separate stop for restricting the upward movement of the pin of the loaded locking means superfluous. By a single grip the locking means can be removed without it being necessary to dismantle the driver, whereby a great saving of time and an increased output results when the pattern of the braid has to be changed frequently.

The securing of the disk to the driver by means of a screw joint is a considerable advantage over the known method for riveting the disks to the drivers as it permits a convenient exchange of the worn disks.

I claim:

1. The combination of a pair of rotary intergeared drivers having their axes substantially parallel, a spool carrier having a coupling portion and being transferable back and forth from one to the other driver, and bolts respectively slidable rectilineally in the drivers into and out of and each normally held in position to engage said coupling portion and lock the carrier to the driver containing such bolt and each having as a fixed part thereof a cam-portion to be engaged by the cam-portion of the other both, each bolt on alternate revolutions of the drivers being arranged to wedge itself between said coupling portion of the carrier and the cam-portion of the other bolt to force the latter clear of the former.

2. In a braiding machine having a spool-carrier transferable from one to the other of two rotary intergeared drivers, the combination, with such a driver, of means to lock the carrier thereto including a bolt removably arranged in and movable back and forth in the driver to and from locking position and protruding from the driver, and a spring housed in the driver and having disengageable engagement with the protruding portion of the bolt and normally holding the latter in the driver.

3. In a braiding machine, the combination with a plurality of spool-carriers each having a circular recess provided in their lower ends, of drivers provided with gear wheels and with notches for the reception of the spool carriers, and locking means comprising a pin guided in the body of the gear wheel, the upper end of said pin adapted to enter into the circular recess of a spool-carrier and the lower end having a plate rigidly fixed thereto for operating the locking means and effecting the transfer of a spool-carrier from one driver to an adjacent driver.

4. In a braiding machine, the combination with a plurality of spool-carriers each having a circular recess provided in their lower ends, of drivers provided with gear wheels made in one piece with the drivers and with notches for the reception of the spool-carriers, and locking means comprising a pin guided in the body of the gear wheel, the upper end of said pin adapted to enter into the circular recess of a spool-carrier and the lower end having a plate rigidly fixed thereto for operating a co-operating locking means and effecting the transfer of a spool-carrier from one driver to an adjacent driver.

5. In a braiding machine, the combination with a plurality of spool-carriers each having a circular recess provided in their lower ends, of drivers provided with gear wheels made in one piece with the drivers and with notches for the reception of the spool-carriers, and locking means comprising a pin guided in a bore provided in the body of the gear wheel at an angle to the axis of the driver, the upper end of said pin adapted to enter into the circular recess of a spool-carrier and the lower end having a plate rigidly fixed thereto for operating the locking means of an adjacent driver and thereby effecting the transfer of a spool-carrier from one driver to an adjacent driver.

6. In a braiding machine, the combination with a plurality of spool-carriers each having a circular recess provided in their lower ends, of drivers provided with gear wheels made in one piece with the drivers, and with notches for the reception of the spool-carriers, and locking means comprising a pin guided in a bore provided in the body of the gear wheel at an angle to the axis of the driver, a spring arranged at the side of the pin and detachably connected to the locking means and adapted to urge the latter in the upward direction for causing the upper end of said pin to enter into the circular recess of a spool-carrier, and a plate rigidly fixed to the lower end of said pin for operating the locking means and effecting the transfer of a spool-carrier from one driver to an adjacent driver.

7. In a braiding machine, the combination with a plurality of spool-carriers each having a circular recess provided in their lower ends, of drivers provided with gear wheels made in one piece with the drivers, disks connected to said drivers by means of a screw joint and provided with notches for the reception of the spool-carriers, and locking means comprising a pin guided in a bore provided in the body of the gear wheel at an angle to the axis of a driver, the upper end of said pin adapted to enter into the circular recess of a spool-carrier and the lower end having a plate rigidly fixed thereto for operating the locking means and effecting the transfer of a spool-carrier from one driver to an adjacent driver.

8. In a braiding machine, the combination with a plurality of spool-carriers each having a circular recess provided in their lower ends, of drivers provided with gear wheels made in one piece with the drivers, disks connected to said drivers by means of a screw joint and provided with notches for the reception of the spool-carriers, and locking means comprising a pin guided in a bore provided in the body of the gear wheel at an angle to the axis of the driver, a spring arranged at the side of the pin and detachably connected to the locking means and adapted to urge the latter in the upward direction for causing the upper end of said pin to enter into the circular recess of a spool-carrier, and a plate rigidly fixed to the lower end of said pin for operating the locking means to permit the transfer of a spool-carrier from one driver to an adjacent driver.

9. In a braiding machine, the combination with a plurality of spool-carriers each having a circular recess provided in their lower ends, of drivers provided with gear wheels made in one piece with the drivers, disks connected to said drivers by means of a screw joint and provided with notches for the reception of the spool-carriers, a sleeve member provided below each driver and having a cylindrical bore, the lower end of the driver fitting and projecting into said bore to a greater or smaller extent for adjusting the elevation of the drivers, and locking means comprising a pin guided in a bore provided in the body of the gear wheel at an angle to the axis of the driver, the upper end of said pin adapted to enter into the circular recess of a spool-carrier and the lower end having a plate rigidly fixed thereto for operating the locking means and effecting the transfer of a spool-carrier from one driver to an adjacent driver.

10. In a braiding machine, the combination with a plurality of spool carriers each having a circular recess; of notched drivers for the reception of said carriers, gear wheels on the drivers and depressible pins movable with the carriers and arranged to enter said circular recesses and hold the carriers in the notches of the drivers, and means on the lower ends of said pins arranged to co-operate when adjacent drivers move to transferring position to release the spool carrier from one driver and transfer it to the other.

In testimony whereof I affix my signature.

XAVER PFRUNDER.